(12) United States Patent
Avziz et al.

(10) Patent No.: US 12,518,654 B2
(45) Date of Patent: Jan. 6, 2026

(54) MULTI-TOOL MEDICAL SIMULATION SYSTEM AND METHOD

(71) Applicant: SIMBIONIX LTD., Airport City (IL)

(72) Inventors: Tal Avziz, Shoham (IL); Ariel Ben Moshe, Shoham (IL); Jacov Blank, Ramat Hasharon (IL); Leonid Notkin, Rehovot (IL)

(73) Assignee: SIMBIONIX LTD., Airport City (IL)

(*) Notice: Subject to any disclaimer, the term of this patent is extended or adjusted under 35 U.S.C. 154(b) by 774 days.

(21) Appl. No.: 17/760,853

(22) PCT Filed: Sep. 18, 2020

(86) PCT No.: PCT/IL2020/051024
§ 371 (c)(1),
(2) Date: Mar. 16, 2022

(87) PCT Pub. No.: WO2021/053677
PCT Pub. Date: Mar. 25, 2021

(65) Prior Publication Data
US 2022/0343799 A1    Oct. 27, 2022

(30) Foreign Application Priority Data
Sep. 19, 2019 (IL) .......................................... 269480

(51) Int. Cl.
*G09B 23/28* (2006.01)
*G16H 70/20* (2018.01)

(52) U.S. Cl.
CPC .......... *G09B 23/285* (2013.01); *G16H 70/20* (2018.01)

(58) Field of Classification Search
None
See application file for complete search history.

(56) References Cited

U.S. PATENT DOCUMENTS

| | | |
|---|---|---|
| 5,501,694 A | 3/1996 | Ressemann et al. |
| 6,038,488 A | 3/2000 | Barnes et al. |
| 6,106,301 A | 8/2000 | Merril |

(Continued)

FOREIGN PATENT DOCUMENTS

| | | |
|---|---|---|
| CN | 101563716 A | 10/2009 |
| WO | 2008/065023 A1 | 6/2008 |
| WO | 2017030435 A1 | 2/2017 |

*Primary Examiner* — James B Hull
(74) *Attorney, Agent, or Firm* — FisherBroyles, LLP; Roger L. Browdy; James E. Mrose

(57) ABSTRACT

A medical simulation system and method comprising a casing device having at least one opening and comprising at least three selectable working stations wherein at least one working station comprising a router; at least one operational tool comprising at least two packed tools capable of bursting out of said operational tool; and at least one sensor, wherein the at least one operational tool or at least one burst out packed tool is configured to be inserted into the at least one opening and through at least one working station; wherein the at least one operational tool or at least one burst out packed tool is configured to pass through and be diverged by the router; and wherein a controller is configured to receive data from the at least one sensor and generate an output representing the said tools' bearings within the casing device as part of simulating a medical procedure.

22 Claims, 11 Drawing Sheets

(56) References Cited

U.S. PATENT DOCUMENTS

| | | | |
|---|---|---|---|
| 6,267,599 B1 | 7/2001 | Bailey | |
| 10,176,727 B2 | 1/2019 | Shabat et al. | |
| 2006/0099560 A1 | 5/2006 | Gregorio et al. | |
| 2006/0234195 A1 | 10/2006 | Grund-Pedersen et al. | |
| 2007/0063971 A1* | 3/2007 | Vecerina | G09B 23/285 |
| | | | 345/156 |
| 2008/0126041 A1 | 5/2008 | Maspoli et al. | |
| 2010/0021875 A1 | 1/2010 | Hendrickson et al. | |
| 2010/0178642 A1* | 7/2010 | Nauroy | G09B 23/28 |
| | | | 434/262 |
| 2014/0349263 A1* | 11/2014 | Shabat | G09B 23/28 |
| | | | 434/262 |
| 2014/0349264 A1 | 11/2014 | Shabat et al. | |

* cited by examiner

MULTI-TOOL MEDICAL SIMULATION SYSTEM AND METHOD

FIELD OF THE INVENTION

The present invention relates to the field of medical simulation systems, and more particularly, to a multi-tool medical simulation system configured to provide a tactile feedback.

BACKGROUND OF THE INVENTION

Various medical procedures such as endovascular procedures can pose challenges even to the most experienced physicians. In order to perform endovascular procedures, a physician may insert and manipulate several operational tools. Endovascular procedures such as, an angioplasty balloon procedure to eliminate lesions in a blood vessel, an intra-artery/intra-venous surgical repair, an electrophysiological mapping or structural heart repair requires the insertion of guidewires, catheters and sheaths into a patient's arterial or venous systems, until reaching the operation point (i.e. point of lesion or other area of repair). During the navigation in the patient's vascular system various imaging means may be used to provide the physician with information regarding tools' progression within the patient's organs. Such imaging may be obtained by the physician injecting a contrasting fluid into the vascular system to allow a visual inspection of inserted tools' bearings (i.e. positioning, orientation, operational state, etc.) on a display (e.g., a fluoroscopy display under continuous X-ray radiation). An operational tool may include several components, for example, a guidewire coaxially located inside a catheter, which in turn is coaxially located inside a sheath.

Medical procedures, such as an angioplasty balloon procedure may involve remotely controlling operational tools while being manipulated within the vascular system. Such manipulation may be performed by delicate and coordinated hand movements wherein said manipulation is being monitored by images displayed upon a display. The delicate and coordinated hand movements themselves are spatially unrelated to the view of the remotely controlled operational tools received on a video monitor. This partial representation may pose some challenges. For example, depth perception is lacking on a flat video display and therefore it is not an easy task to learn to control the tools through said spatially arbitrary linkage. A mistake made during a complicated procedure can be dangerous, therefore, a high level of skill is required, and a realistic training of these specialists is a necessary task. A training may include, for example, a trainer or instructor may guide a trainee to manipulate the operational tools inside the arterial network of a patient possibly suffering from a heart disease or a patient undergoing a heart attack.

Image-guided procedures, such as vascular catheterization, angioplasty, and stent placement, are especially suited for simulation since actual operation of such procedures typically places the physician at-a-distance from the operative site while manipulating operational tools and watching his actions on a video monitor. Several systems have been developed to train physicians in angioplasty procedures. For example, U.S. Pat. No. 10,176,727 or U.S. application 13/952,681 which disclose a foldable medical simulation system that comprises a foldable base having at least two portions comprising station units while an operational tool and its coaxial tools are configured to be inserted into said station units. Each foldable base portion is configured to receive an operational tool that comprises up to two coaxial tools stored therewith. Each station unit comprises a force feedback mechanism comprising a lever that applies alternating force upon the operational tool and any coaxial tools therein according to predetermined simulation parameters and in accordance with tool measurements and characteristics.

There is a need to provide an advanced medical simulating system that enables a concurrent use of a large number of tools, and provide more realistic, subtle and accurate feedback mechanism in order to provide an accurate simulation of a medical procedure.

SUMMARY OF THE INVENTION

The present invention provides a medical simulation system that addresses the need to provide medical personnel with a real-time, high accuracy training that provides both visual and haptic feedback in order to realistically mimic a medical procedure.

The invention enables the selection of various simulated medical scenarios to be treated using a manual, physical manipulation of multiple real-life tools, thus recreating an efficient training experience that prepares physicians to treat a patient having a real medical condition.

The invention is further implemented by the use of a haptic force feedback mechanism configured to provide alternating resistance levels applied upon a manipulated tool, thus providing a crucial feedback essential for a successful treatment of a medical condition.

The present invention suggests an efficient and reliable simulation system enabling various training scenarios thus improving the specialization and expertise of a medical personnel while reduces the risk of medical mistakes occurring during a real-life medical procedure.

The following embodiments and aspects thereof are described and illustrated in conjunction with systems, devices and methods which are meant to be exemplary and illustrative, not limiting in scope. In various embodiments, one or more of the above-described problems have been reduced or eliminated, while other embodiments are directed to other advantages or improvements.

According to one aspect, there is provided a medical simulation system comprising a casing device having at least one opening and comprising at least three working stations wherein at least one working station comprising a router; at least one operational tool comprising at least two packed tools capable of bursting out of said operational tool; and at least one sensor.

According to some embodiments, the at least one operational tool or at least one burst out packed tool is configured to be inserted into the at least one opening and through at least one working station.

According to some embodiments, the at least one operational tool or at least one burst out packed tool is configured to pass through and be diverged by the router.

According to some embodiments, a controller is configured to receive data from the at least one sensor and generate an output representing the said tools' bearings within the casing device.

According to some embodiments, the casing device comprising sensors configured to track the bearings of the at least one operational tool or at least one burst out packed tool.

According to some embodiments, the operational tool is configured to be inserted into the router and stop while at least one burst out tool of the at least two packed tools continue to be movable and navigable toward a desired route.

According to some embodiments, the router comprising a turning arm used to diverge the operational tool or at least one burst out packed tools.

According to some embodiments, the router comprising a motor used to diverge the operational tool or at least one burst out packed tools.

According to some embodiments, at least one working station is configured to comprise at least two station units, each capable of accommodating at least one operational tool or at least one burst out packed tool.

According to some embodiments, the router is configured to diverge the at least one operational tool or at least one burst out packed tool into at least one station unit.

According to one aspect, there is provided a station unit comprising a conduit that can be a resilient tube and capable of accommodating at least one operational tool or at least one burst out packed tools and a haptic force feedback mechanism configured to apply force on said conduit.

According to some embodiments, the haptic force feedback mechanism is configured to apply alternating levels of pressure on the conduit and as a consequence, apply alternating levels of pressure on the at least one operational tool or on at least one burst out packed tools accommodating said conduit.

According to some embodiments, at least one of the alternating levels of force is measured by at least one homing sensor and the measurements are used by the controller to regulate the alternating levels of force in order to simulate a medical procedure.

According to some embodiments, the vertical force applied by the haptic force feedback mechanism is translated into longitudinal pressure on the conduit affecting the movement of the at least one operational tool or the at least one burst out packed tool accommodating said conduit.

According to some embodiments, a diameter recognition sensor that may be an optical sensor is configured to recognize the diameter of the operational tool or the burst out packed tool accommodating the station unit.

According to some embodiments, a tracking sensor that may be an optical navigation sensor and may be calibrated by a self calibration process is configured to detect information regarding the bearings of the at least one operational tool or the burst out packed tool inside the station unit.

According to some embodiments, the haptic force feedback mechanism comprising application of pressure on the conduit by alternating levels of vertical force.

According to some embodiments, the homing sensor is configured to sense the operational tool or the burst out packed tool in a pre-defined location within station unit.

According to some embodiments, a connection base is configured to enable the possible manual assembly and disassembly of each station unit.

According to some embodiments, a visual indication is configured to indicate whether the station unit is securely assembled onto its connection base.

According to some embodiments, a visual indication is configured to indicate the advancement of the at least one operational tool or a burst out packed tool along the length of the station unit.

According to some embodiments, a visual indication is configured to indicate the presence of either the at least one operational tool or a burst out packed tool inside each station unit by displaying different visual marks accordingly.

According to a second aspect, there is provided a method for simulating medical procedures comprising the steps of selecting, using a controller, a type of medical procedure or a type of operational tool or a type of at least two packed tools capable of bursting out from said operational tool; inserting the at least one selected operational tool into a casing device; diverging the at least one operational tool or at least one burst out packed tool into at least one of at least two station units and displaying, using the controller, a simulated image of the at least one operational tool or the at least one burst out packed tool as part of simulating a medical procedure.

According to a third aspect, there is provided a method for simulating medical procedures comprising the steps of selecting, using a controller, a type of medical procedure or a type of operational tool or a type of at least one packed tool capable of bursting out from said operational tool; inserting the at least one operational tool or at least one burst out packed tool into a station unit and applying, using the controller, alternating levels of pressure on the operational tool or on at least one burst out packed tool as part of simulating a medical procedure.

BRIEF DESCRIPTION OF THE FIGURES

Some embodiments of the invention are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the invention. For the sake of clarity, some objects depicted in the figures are not to scale.

In the Figures.

DETAILED DESCRIPTION OF SOME EMBODIMENTS

Figure 1A:
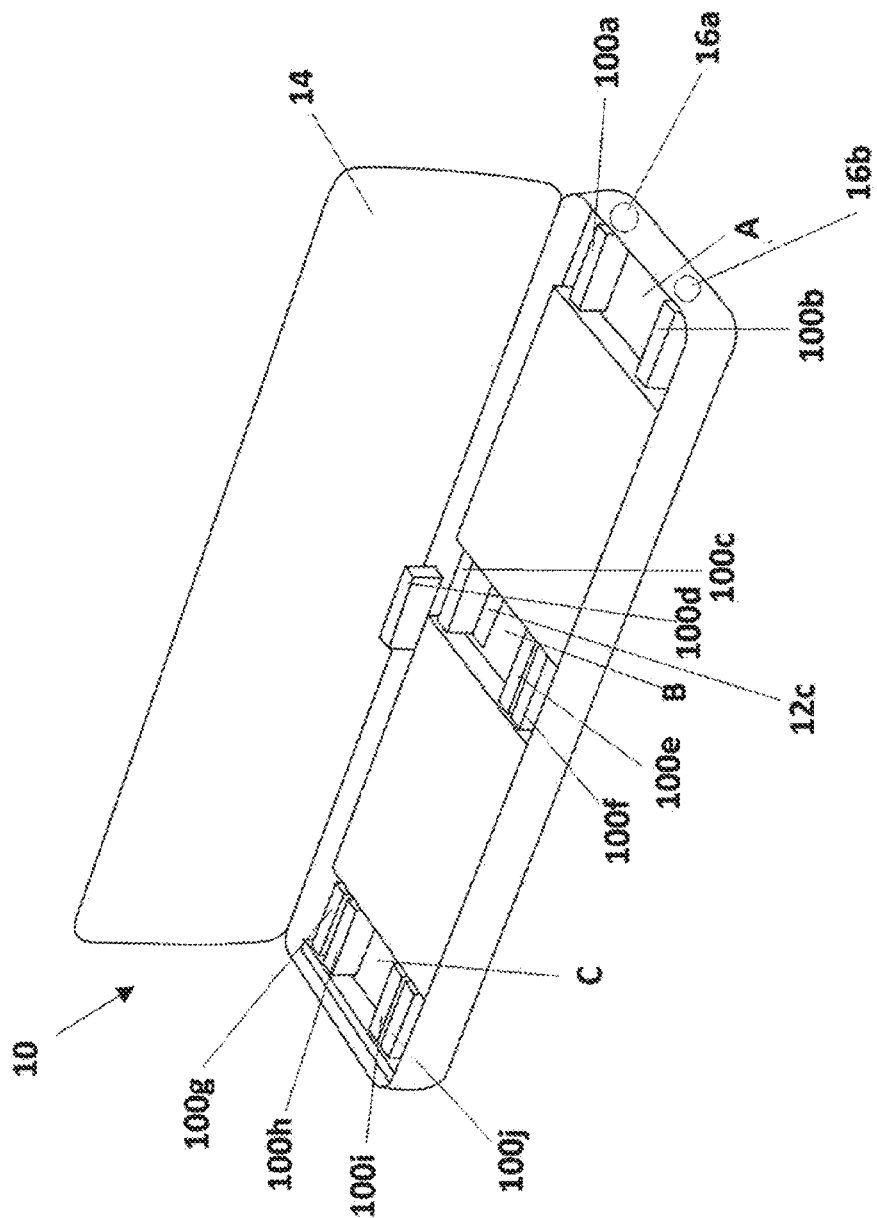
FIG. 1A constitutes a view in perspective of a casing device for a medical simulation system, according to some embodiments of the invention.

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", "setting", "receiving", or the like, may refer to operation(s) and/or process(es) of a controller, a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

The term "computerized anatomy", as used herein, refers to a computer program that can simulate an organ in which a medical procedure is to be performed, for example, an artery network, a heart etc. Such simulation can be, but not limited to, by graphic means.

The term "controller", as used herein, refers to any type of computing platform that may be provisioned with a memory device, a Central Processing Unit (CPU) or microprocessor device, and several input/output (I/O) ports, such as, a general-purpose computer, for example, a personal computer, a laptop, a tablet, or a smartphone as well as a cloud computing system.

The term "processor", as used herein, refers to any type of Processing Unit (CPU) or microprocessor device that carries out the instructions of a computer program.

The term "bearings", as used herein, refers to any posture or movement of a tool inside a patient's actual organ or simulated organ, for example, the location and orientation of a tool inside a patient's arterial network.

The term "packed tools", as used herein, refers to one or several tools stored inside an operational tool that are capable of bursting out from it, separately or jointly, and continue to be advanced in a desired route. Such tools may be of various types such as simple guidewire, balloon, sheath or other elaborate operation tools. Packing of the tools can be side-by-side, coaxial or a combination thereof.

The term "pipes", as used herein, refers to hollow cavities configured to enable the insertion of an operational tool or its burst out packed tools passing therewith.

The term "plug and play" mechanism, refers to any docking or assembling mechanism that allows a user to assemble a system using few simple actions, for example, clamping, pushing, inserting, etc.

Embodiments of the invention are related to a medical simulation system for simulating image-guided medical procedures using a computerized anatomy, for example, endovascular procedures. According to some embodiments, the system may include two main components: a controller such as a computer that executes simulation software and a casing device that enables a user (e.g., a physician or a trainer) to physically manipulate operational tools through and within it.

The user may select a type of medical procedure and/or a type of operational tool, using a user interface, and the computer may control various components and mechanisms included in the casing device, such that during manipulation of an operational tool, the user may receive various feedback outputs such as image observations of tools' movement and orientation.

The user may also sense a tactile feeling simulating the force being applied upon an operational tool in accordance with selected types of medical procedures, the type of tool used or type of medium in which tool is to operate, such that the feed-back force will be in direct relation to user's actual application of force.

The simulation software may include a computerized anatomy simulating the organ in which the medical procedure is to be performed, for example, an artery or venous system. The computer may display to the user a simulated image of the computerized anatomy that mimics a realistic image of an organ as would have appeared on a real display during a real medical procedure. For example, a fluoroscopic image of the artery or venous system while a simulated tool traveling through it.

The casing device may further include various components configured to track the movements of various operational tools and apply force to one or more of said tools. A set of components configured to track the movement and apply force to a single tool or a plurality of tools going through a station unit in unison, may be assembled together in a single station unit. A plurality of station units, assembled in the casing device may be substantially identical to each other; thus, any station unit may be assembled at any position within the casing device. Upon docking, each component within a station unit may be located at an appropriate position and automatically calibrated to track the movements and apply force to different tools. The station units may be modularly removable (by easy assembly or disassembly) in order to perform various simulation scenarios or for replacement and maintenance purposes.

Figure 1B:
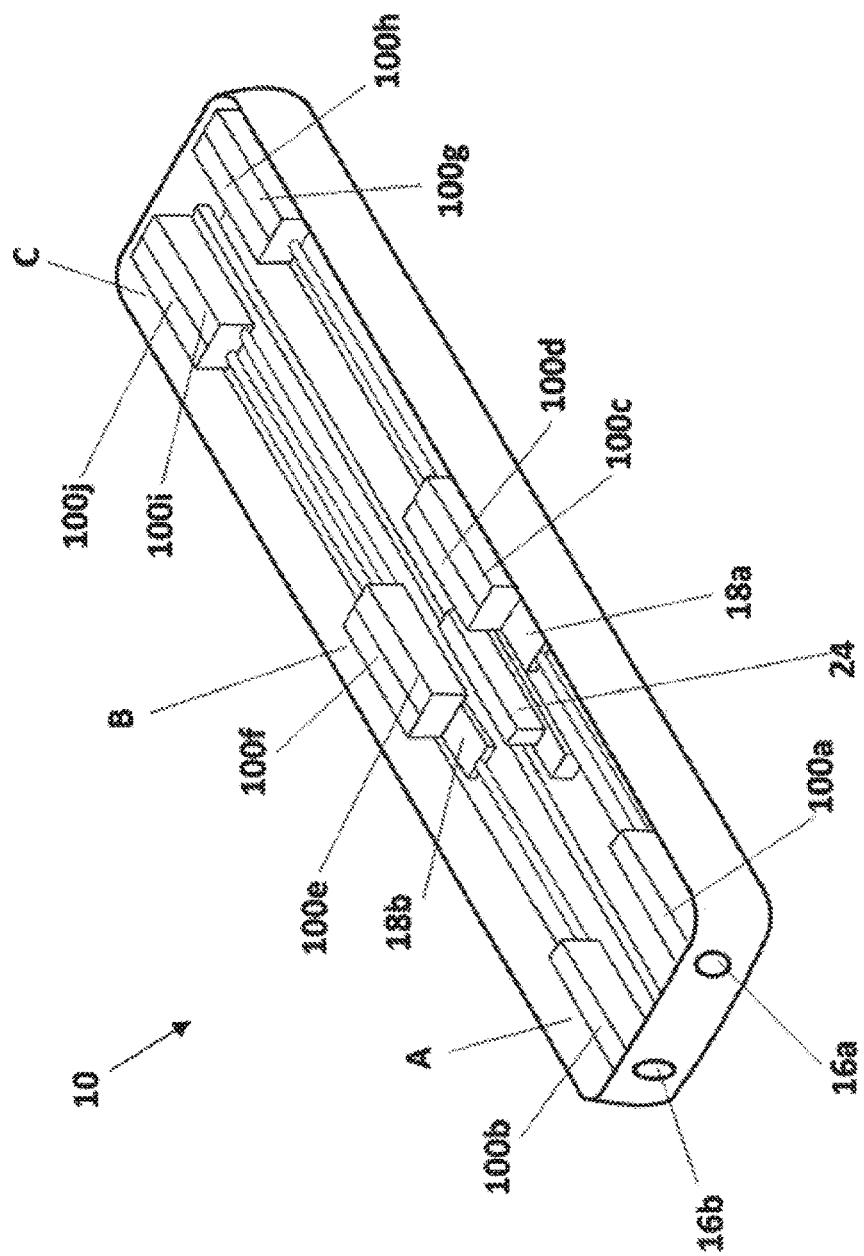
FIG. 1B constitutes a view in perspective of the internal components of a casing device of a medical simulation system, according to some embodiments of the invention.

Reference is made to FIGS. 1A and 1B, which constitute a view in perspective of a casing device 10 of a medical simulation system according to some embodiments of the invention. As shown, a casing device 10 comprises at least three working station docking areas A, B and C, wherein each working station docking area is capable of receiving a plurality of removable station units 100a-100j assembled and docked onto a corresponding connection bases 12a-12f (only 12c is shown on FIG. 1A).

According to some embodiments, a removable cover 14 can be opened and closed in order to allow manual access to the plurality of station units 100. According to some embodiments, said movable cover 14 may have openable segments enabling quick, easy-access to the plurality of station units 100 within casing device 10.

According to some embodiments, at least one operational tool 200 (shown in FIGS. 3, 4A and 6B), to be manipulated by a user, may be inserted into either openings 16a or 16b of the casing device 10. According to some embodiments, operational tool 200 may include at least two packed tools stored therewith (not illustrated). According to some embodiments, the quantity and variety of packed tools included in operational tool 200 correspond to an actual real-life operational tool packing which may include one or several tools of different kinds and types arranged at different orientations.

According to some embodiments, the medical simulation system may be controlled by the controller (not illustrated) that may control the various components included in each of the station units 100a-100j, receive signal which enable tracking the movement of operational tool 200 and packed tools therein and in response, apply haptic feed-back force to it, based on a simulation program selected by the user or by the controller. According to some embodiments, said haptic feed-back force may be applied in accordance to an actual force applied by the user, or as inputs applied by the simulation program in order to emulate various user feed-back experiences. According to some embodiments, the controller may be integrated into the casing device 10.

According to some embodiments, the system may further include a simulated injection system (not illustrated) for simulating a medical scenario, for example, an injection of a contrasting fluid.

According to some embodiments, operational tool 200 comprises at least two packed tools stored therewith. For example, operational tool 200 may include a sheath comprising a catheter (such as a balloon catheter). In yet another example, operational tool 200 may include a guidewire inserted into a catheter. According to some embodiments, the catheter comprising the guidewire may further be inserted into a sheath, forming a three packed tools arrangement. According to some embodiment, operational tool 200 may comprise four or more packed tools arrangement. In some embodiments, operational tool 200 may include a single tool, for example a balloon catheter.

According to some embodiments, the casing device 10 further comprising a data communication connection hub 24 connecting with all station units 100a-100j. According to some embodiments the hub can be a USB hub or any other data communication connection hub. According to some embodiment, hub 24 is further connected to the controller either by wire or by a wireless connection.

Figure 2A:
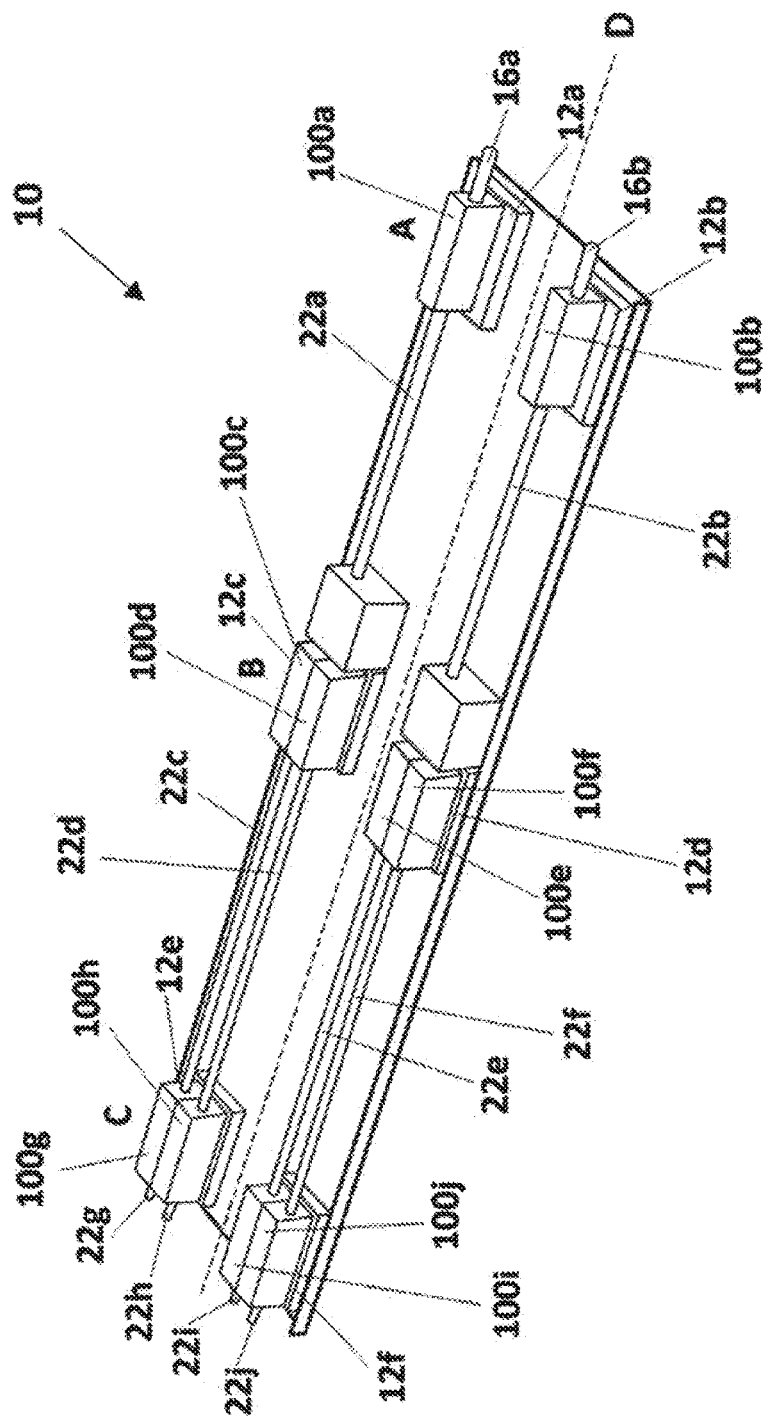
FIG. 2A constitutes a view in perspective of working stations arrangement of a medical simulation system, according to some embodiments of the invention.
Figure 2B:
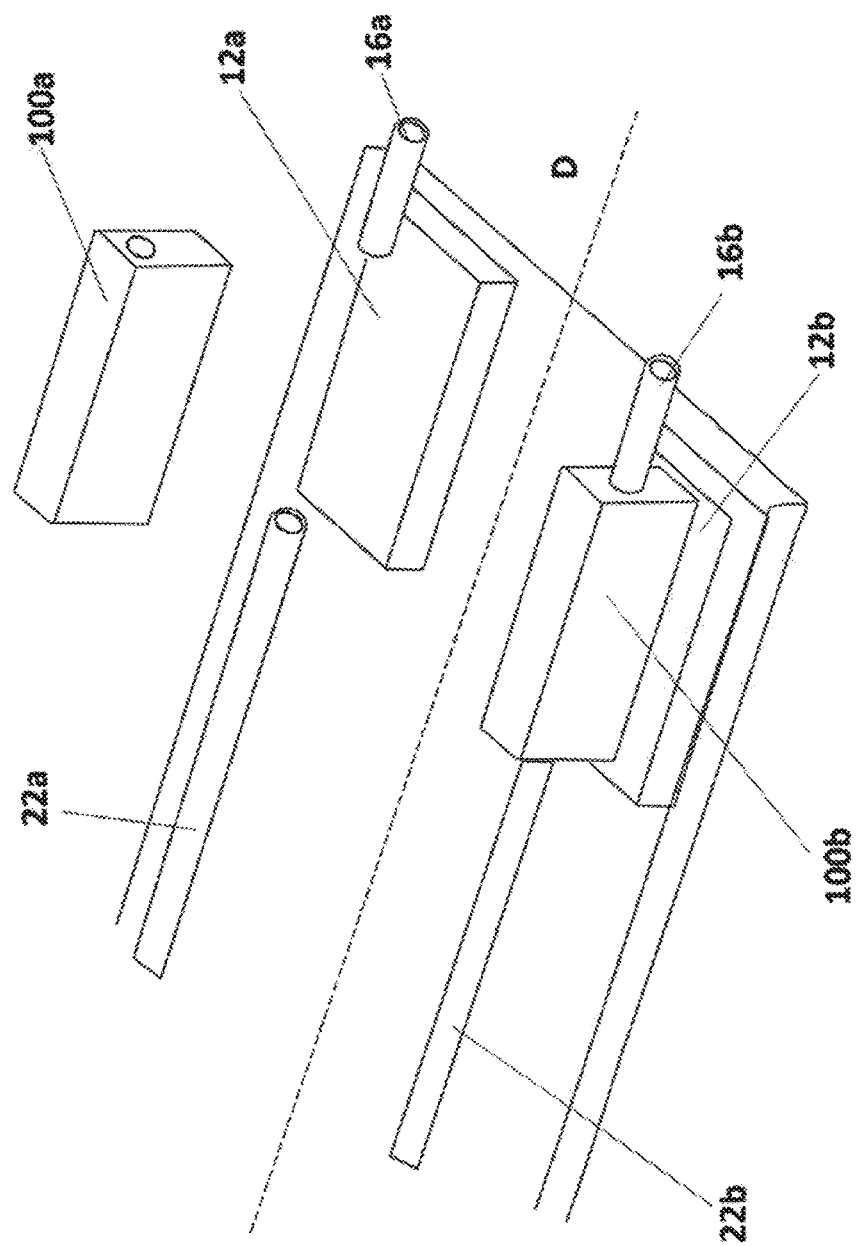
FIG. 2B constitutes a partial view in perspective of the working stations arrangement of FIG. 2A, according to some embodiments of the invention.

Reference is made to FIGS. 2A and 2B which constitute a view/partial view in perspective of working stations arrangement of a medical simulation system according to some embodiments of the invention. As shown, three working stations A, B and C are positioned along a longitudinal line D of the casing device 10. According to some embodiments, station units 100a and 100b are assembled at position A and may apply force and track the movement of an operational tool 200 such as a sheath having a substantially arterial diameter (such as approximately 2-6 mm), station units 100c-100f are assembled at position B and may apply force and track the movement of a burst forth packed tool such as a catheter having a substantially smaller diameter (such as approximately 0.5 mm) and station units 100g-100j assembled at position C and may apply force and track the movement of a burst forth packed tool such as a guidewire having a smaller diameter (such as approximately 0.1-0.3 mm). According to some embodiments, all station units 100 may be substantially identical and configured to manipulate any operational tool comprising any diameter.

According to some embodiments, pipes 22a-22j are configured to enable tool 200 and its packed tools to pass therein and through relevant station units 100a-100j assembled at different working station A, B or C and along the longitudinal line D of the casing device 10. For example, and according to some embodiments, parallel station units 100c and 100d that are located at working station B, are connected each through pipes 22c and 22d, respectively, to the following parallel station units 100g and 100h located at working station C.

According to some embodiments, connection bases 12a-12f are configured to enable assembly and disassembly of each station unit 100 by any known attachment means. According to some embodiments, connection bases 12a-12f enables to separately and manually replace each station unit 100.

According to some embodiments, either working station A, B or C may include one or more connection bases 12a-12f to provide a docking platform for working units 100 using "a plug and play" mechanism. A "plug and play" mechanism may allow a user to assemble or disassemble a station unit 100 using three, two or even a one single action. According to some embodiments, connection bases 12a-12f may include any fastening means such as pins, clamps, clips, and the like configured to easily assemble and disassemble a station unit 100.

According to some embodiments, the controller (not illustrated) may be configured to control the image-guided medical procedure by tracking the movement of the operational tool 200 or its burst out packed tools (i.e., tracking information) during the manipulation of operational tool 200 or its burst out packed tools by the user. Said control can be achieved by applying force upon the operational tool 200 or its burst out packed tools that simulate the force that an actual organ tissue would have applied and presenting to the user a realistic image simulation (e.g., a fluoroscopic image) of a patient's organ (e.g., arterial network) and a current location of each operational tool 200 or its burst out packed tools said simulation provide the user with a realistic mechanical feedback experience as to the movement and resistance applied against the tools in real surroundings.

According to some embodiments, the medical simulation system may include a syringe for simulating an inflation of a balloon in a simulated angioplasty stent deployment. The syringe may include a gage working in communication with the controller, such that when the user press the syringe, the simulation software displays a simulated image of an inflated balloon or, alternatively, a stent deployment procedure.

According to some embodiments, the controller may include a user interface that may allow the user to select various parameters related to the simulation. For example, a type of operation to be performed (e.g., opening a blockage in a certain location in a blood vessel), the type of tool to use (e.g., a guidewire, a balloon catheter, a stent delivery catheter, etc.) or the graphical display type (e.g., a fluoroscopic display, a three dimensional simulation of the computerized anatomy, etc.). According to some embodiments, at the end of a simulated operation, the controller may further determine a performance score based on the user's functioning and display the score on the display and/or use the gathered data to assess and evaluate trainee.

Figure 3:
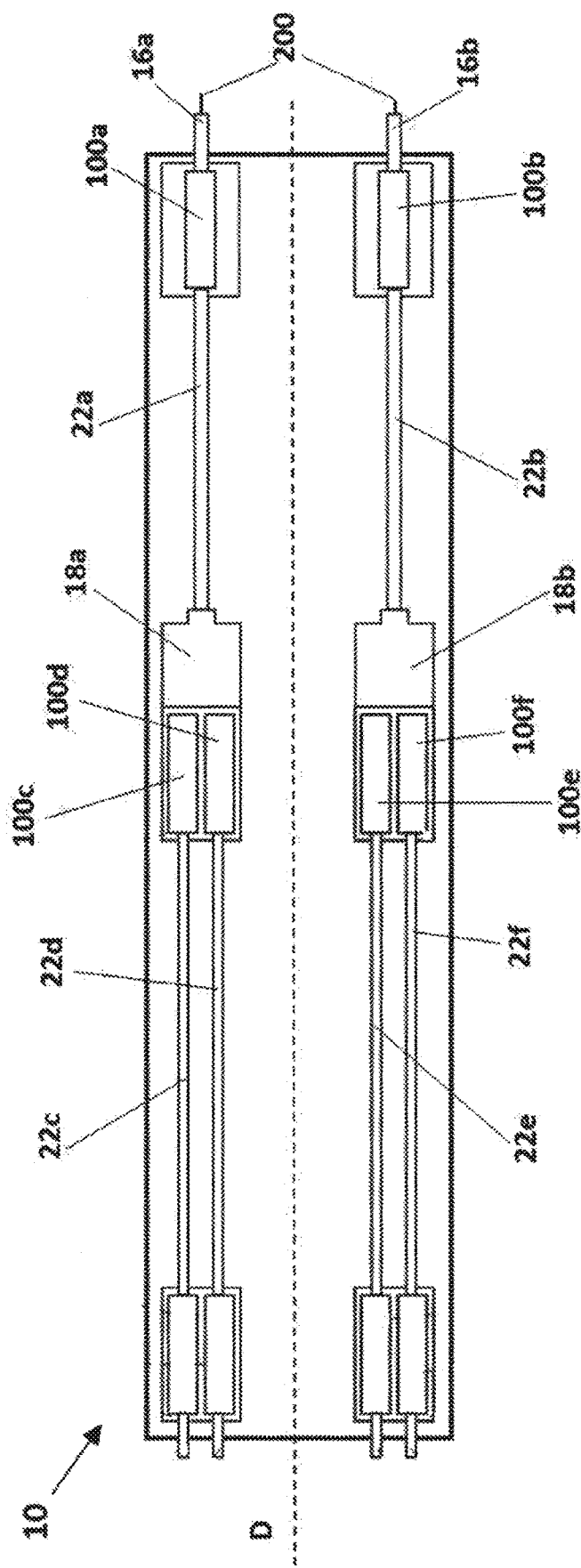
FIG. 3 constitutes a cross-sectional top view of working stations arrangement, according to some embodiments of the invention.

Reference is made to FIG. 3 that shows a cross-sectional top view of working stations arrangement of a medical simulation system according to some embodiments of the invention as shown, casing device 10 comprises routers 18*a* and 18*b* configured to divert the direction and movement of operational tool 200 or it burst out packed tools.

According to some embodiments, at least one operational tool 200 and packed tools stored therewith is configured to be inserted into either openings 16*a* or 16*b*, to be further inserted into either station unit 100*a* or 100*b*, to be further inserted into either pipe 22*a* or 22*b*, and then into either router 18*a* or 18*b*. According to some embodiments, the at least two packed tools included within operational tool 200 are then burst out from operational tool 200 and continue to be advanced toward a divergent point inside either router 18*a* or 18*b*, resulting in each packed tool being navigated toward a desired route that may be, for example, either station units 100*c*-100*f* and either pipes 22*c*-22*f*.

Figure 4A:
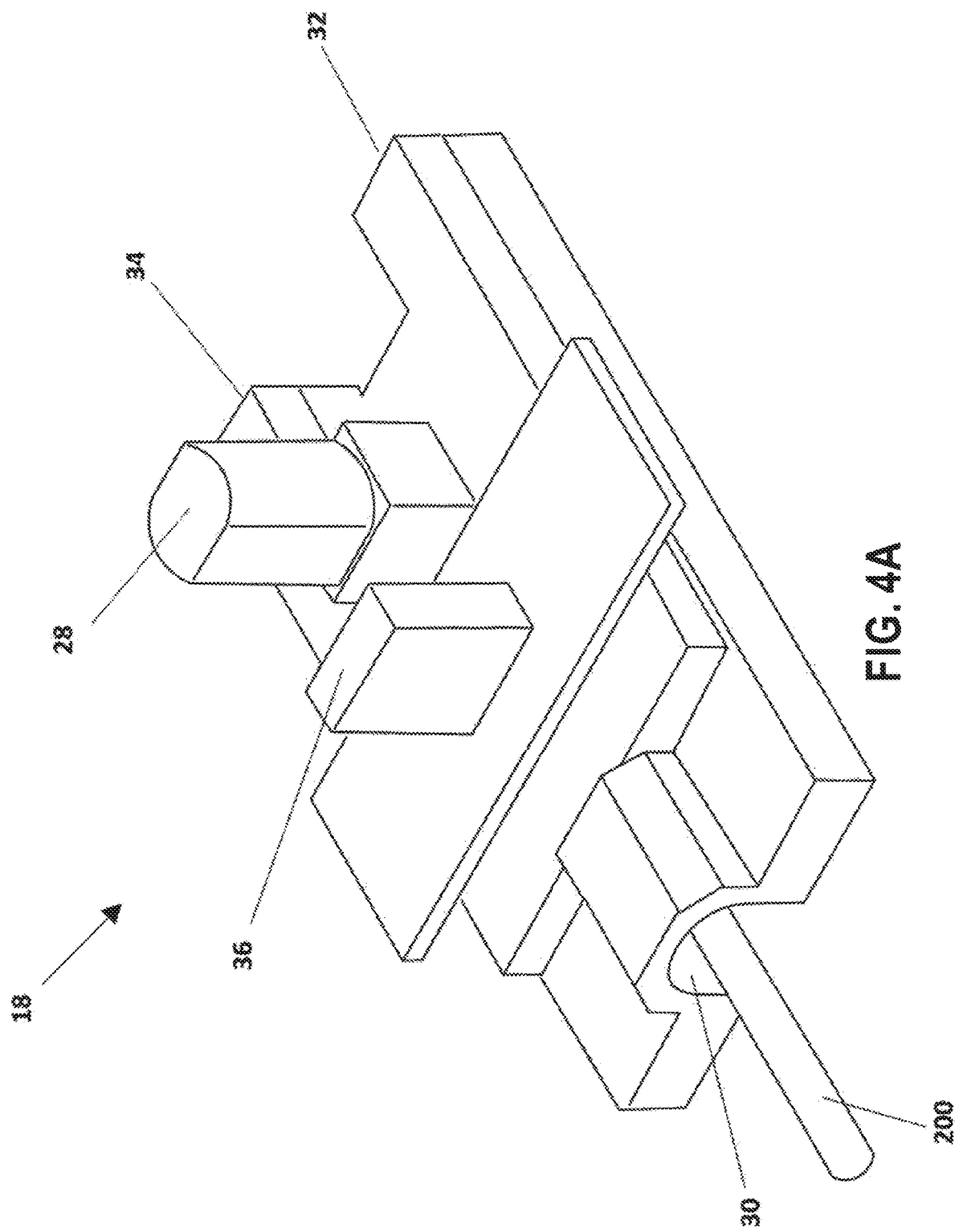
FIG. 4A constitutes a view in perspective of a router, according to some embodiments of the invention.
Figure 4B:
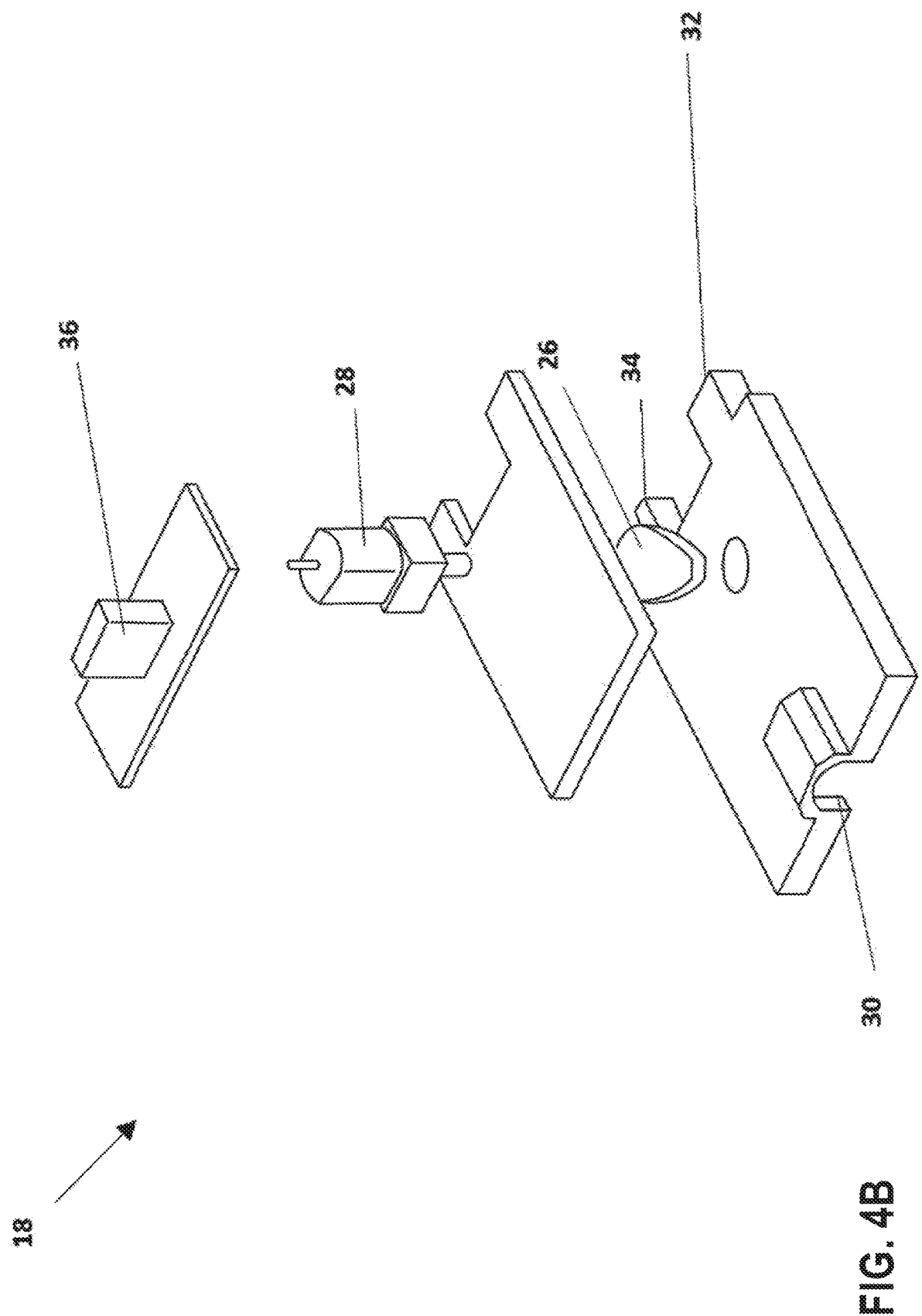
FIG. 4B constitutes an exploded view in perspective of a router, according to some embodiments of the invention.

Reference is made to FIGS. 4A and 4B which constitute a view/exploded view in perspective of a router 18 of the casing device 10 according to some embodiments of the invention. As shown, operational tool 200 is configured to be inserted and continue to be advanced toward a divergent point inside router 18 and then be navigable toward a desired route. According to some embodiments, operational tool 200 is configured to be inserted and stop inside router 18 while its packed tool(s) continue to be advanced toward a divergent point inside router 18 and then be navigable toward a desired route. According to some embodiments, the operational tool 200 or its burst out packed tools that been diverted by one router 18 can be diverged again inside a following router 18 and so forth.

According to some embodiments, the divergence mechanism of router 18 comprises a rotating arm 26 that can diverge operational tool 200 or its burst out packed tools toward a desired route. According to some embodiments, the divergence mechanism of router 18 comprises an electrical motor 28 that can mechanically divert the operational tool 200 or its burst out packed tools into a desired route. According to some embodiments, the controller (not illustrated) is connected by a connector 36 such as a USB interface, a wire connector or wirelessly, to router 18 and determines the desired divergence according to various parameters of a desired simulation.

According to some embodiments, router 18 comprises an inlet 30 and a plurality of exits routes, wherein the divergence mechanism is configured to regulate the divergence of either operational tool 200 or its burst out packed tools into either route.

According to some embodiments, when router 18 has two exit routes (such as two routes 32 and 34) the divergence mechanism can enable either of the following or their combination: (1) stop the operational tool 200 and allow the advancement of one packed tool through route 32 (2) stop the operational tool 200 and allow the advancement of one packed tool through route 34 (3) stop the operational tool 200 and allow the advancement of at least two packed tools through routes 32 and 34. According to some embodiments, the stopping of the operational tool 200 and the continued progression of its packed tool are enabled since the larger diameter of the operational tool 200 prevents it from entering further into router 18.

According to some embodiments, router 18 is configured to divert operational tool 200 or its burst out packed tools into at least one station unit 100. According to some embodiments, router 18 is configured to divert one packed tool into one station unit 100. According to some embodiments, router 18 is configured to divert two packed tools into at least two parallel station units 100. According to some embodiments, router 18 can divert more than two packed tools into more than two station units 100.

Figure 5:
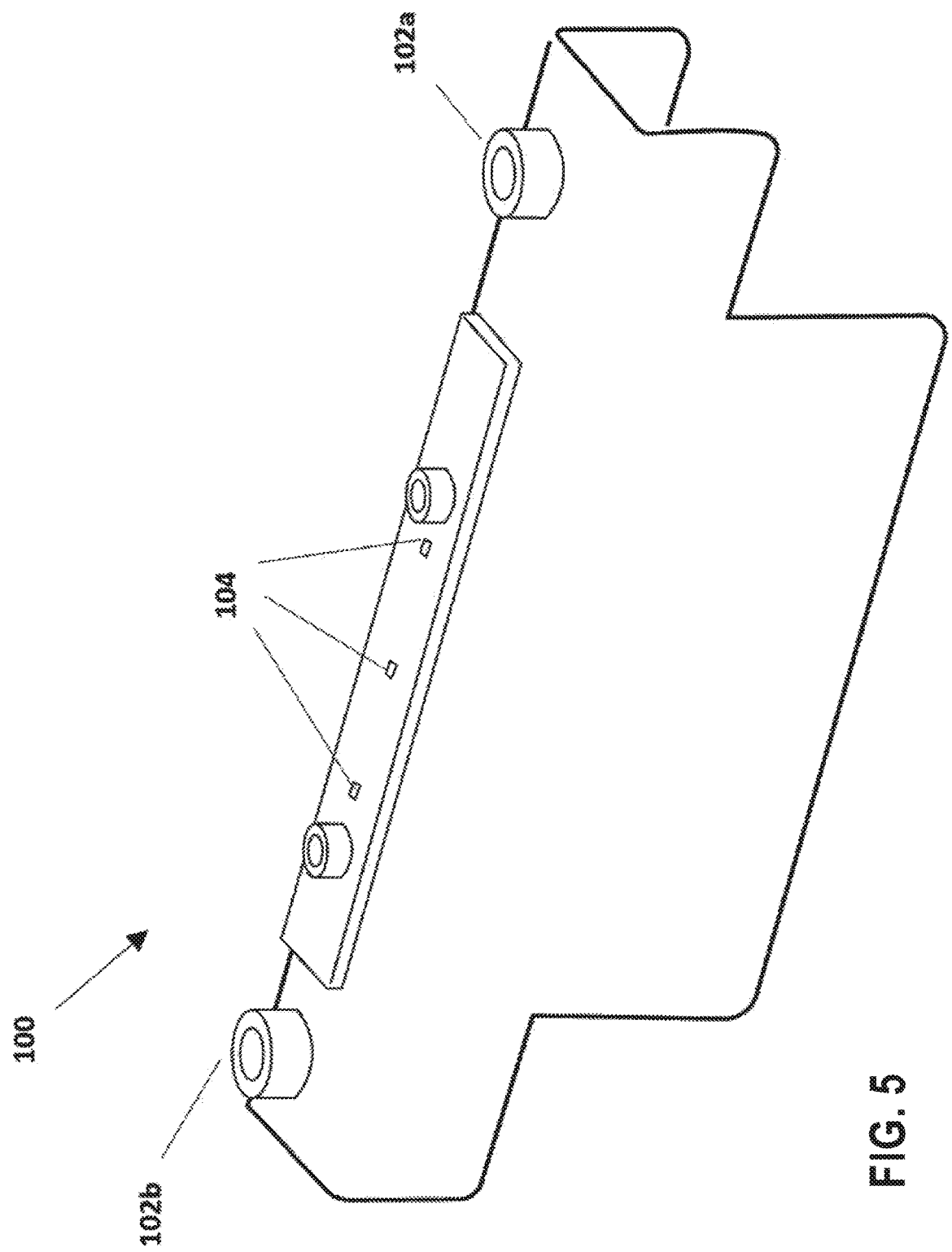
FIG. 5 constitutes a view in perspective of a station unit, according to some embodiments of the invention.

Reference is made to FIG. 5 which constitutes view in perspective of a station unit 100 of the casing device 10 according to some embodiments of the invention. As shown, fasteners 102*a* and 102*b* are configured to secure station unit 100 in place, said fasteners can be, for example, screws or any other known means of attachment. According to some embodiments, fasteners 102*a* and 102*b* enable a manual assembly and release of a station unit 100 upon a connection base 12 (not shown).

According to some embodiments, station unit 100 further comprises visual indication 104 that may indicate the advancement of operational tool 200 or at least one of its burst out packed tools inside and along the length of station unit 100. According to some embodiments, a row of visual marks represents said advancement by a gradual indicium along said advancement line.

According to some embodiments, visual indication 104 may indicate whether a station unit 100 is securely docked onto connection base 12 and/or connected to data communication connection hub 24. According to some embodiments, visual indication 104 indicates whether an operational tool 200 or, alternatively, at least one of its burst out packed tools is accommodating each station unit 100 by displaying various visual marks using visual indication 104. For example, and according to some embodiments, a green light may represent an operational tool 200 accommodating a station unit 100 and a white light may represent a burst out packed tool accommodating a station unit 100 and vice versa.

According to some embodiments, visual indication 104 can be any known visual means perceived by a user's eyes such as, for example, a light, a movement, a color change, a pattern or symbol change, etc. According to some embodiments, visual indication 104 can be any kind of light source, such as, for example, light emitting diodes (LED), or any other known means of illumination.

Figure 6A:
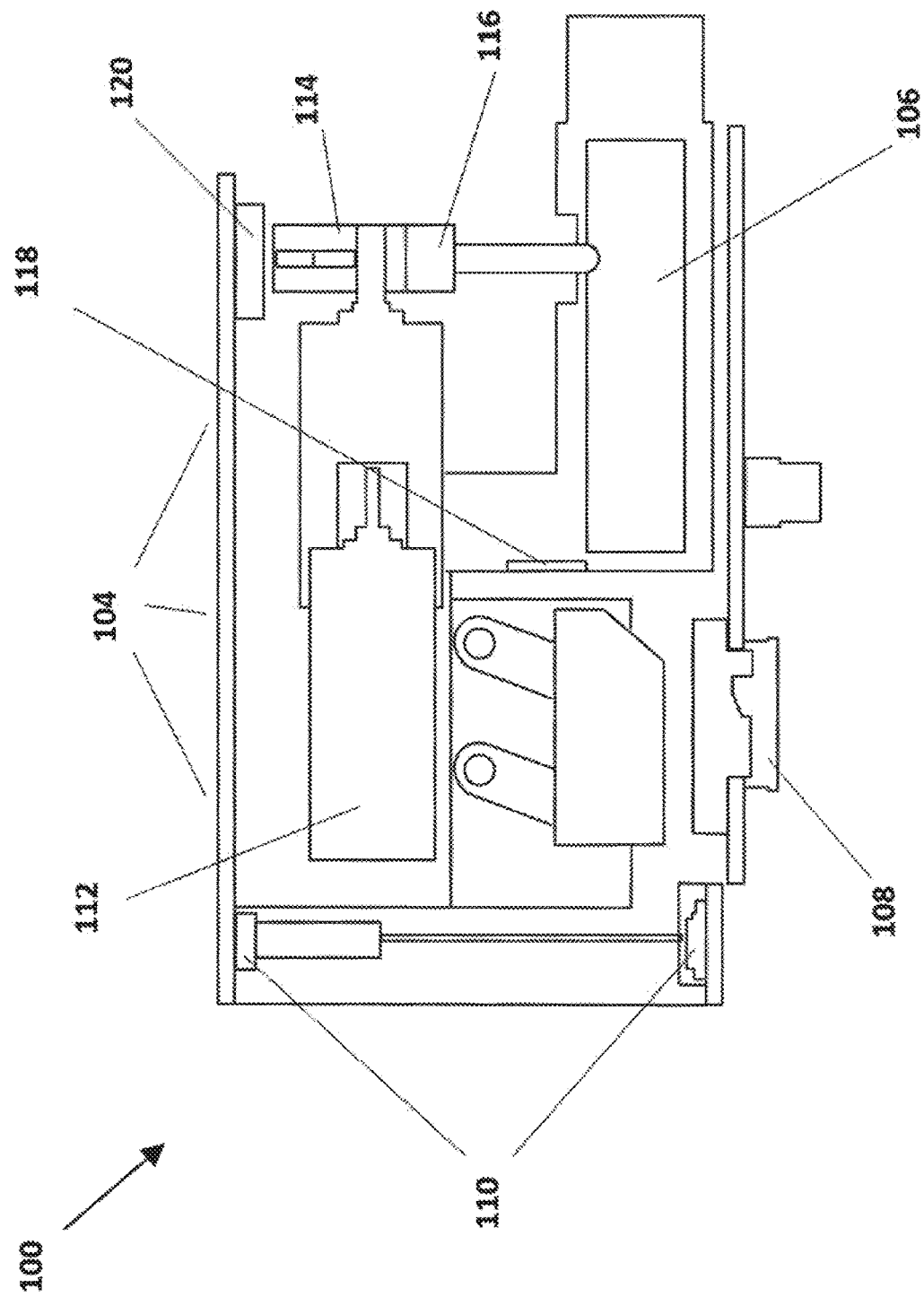
FIG. 6A constitutes a cross-sectional side view of a station unit, according to some embodiments of the invention.
Figure 6B:
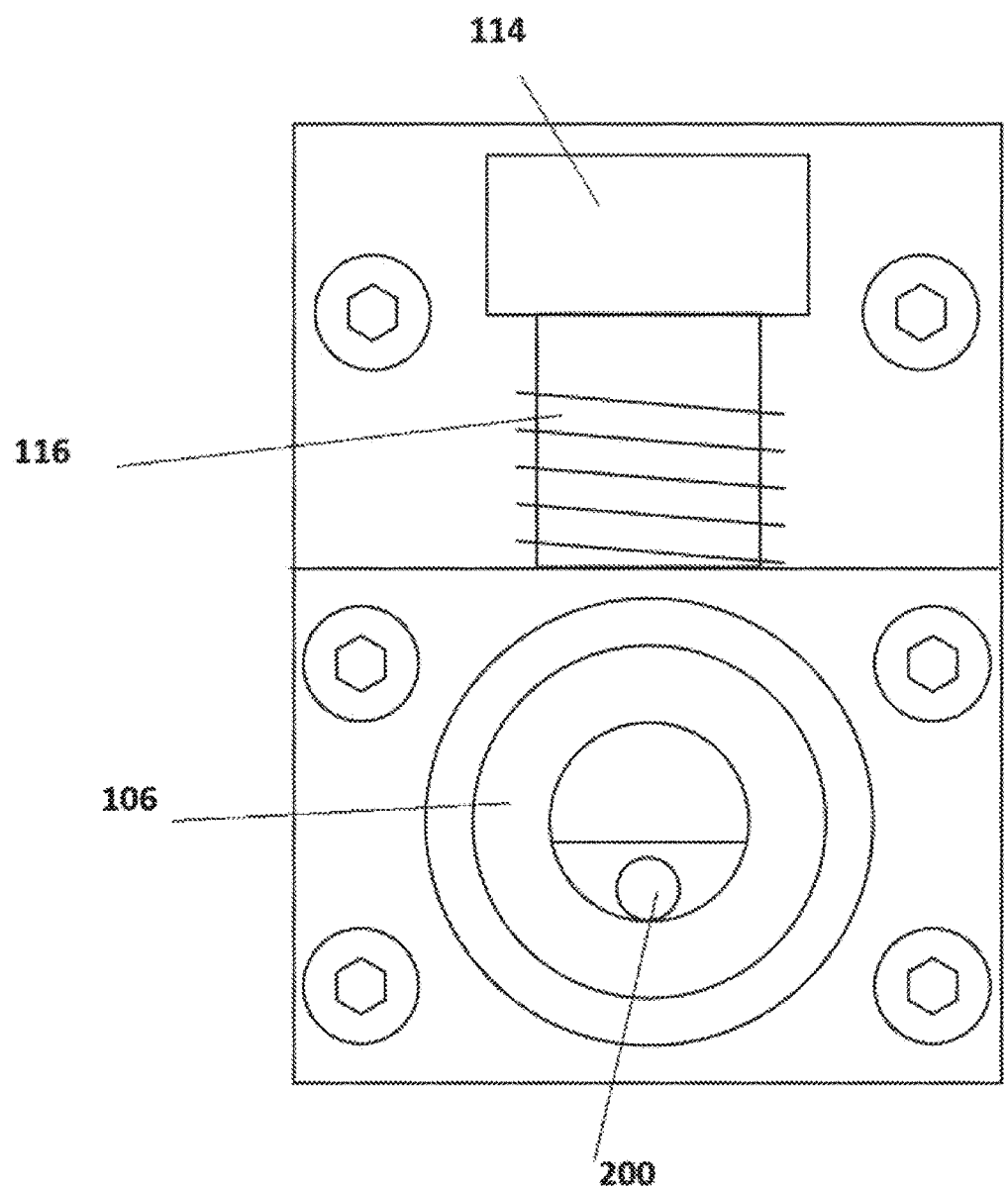
FIG. 6B constitutes a front view of some internal components of a station unit, according to some embodiments of the invention.

Reference is made to FIGS. 6A and 6B. FIG. 6A constitutes a cross-sectional side view/a partial front view of a station unit 100, according to some embodiments of the invention. As shown, station unit 100 comprises a conduit 106 configured to accommodate an operational tool 200 or its burst out packed tools. According to some embodiments, a haptic force feedback mechanism may cause or generate a force resisting the movement of operational tool 200 or its burst out packed tools. A tracking sensor 108 is configured to detect tracking information related to the operational tool 200 or its burst out packed tools (i.e., sensing the positional changes and bearings of operational tool 200 or of its burst out packed tools by way of parameters such as advancement, retraction or orientation). A diameter sensor 110 is configured to detect diameter information related to the operational tool 200 or its burst out packed tools.

According to some embodiments, a homing sensor 120 is configured to enable the station unit 100 to sense an operational tool 200 or its burst out packed tools as they advance to a pre-defined location within station unit 100. Station unit 100 is configured to apply force to said tools in relation to the initial features of the operational tool 200 or its burst out tools (i.e. for through uninterrupted movement no force will be applied by station unit 100 and in case of an interrupted movement, alternating force will be applied in accordance with the alternating diameter of the operational tool 200 or its burst out tools). According to some embodiments, the homing sensor 120 provides an alternating offset to the force feedback applied and thus fast response time that enables the adjustment of applied force in accordance with alternating tools diameter. For example, and according to some embodiments, homing sensor 120 enables the haptic force feedback mechanism to apply force to said tools in order to simulate a medical procedure (such as emulating close proximity to a physical member). According to some embodiments, tracking sensor 108 is an optical navigation sensor. According to some embodiments, said optical navigation sensor uses a laser chip.

According to some embodiments, the haptic force feedback mechanism is configured to apply alternating levels of force upon conduit 106 and as a consequence, to cause conduit 106 to apply alternating levels of force on the at least one operational tool 200 or its burst out packed tools placed therewith. According to some embodiments, conduit 106 is made of resilient matter such as, but not restricted to, silicon, rubber, plastic etc. According to some embodiments, the pressure applied by the haptic force feedback mechanism deforms conduit 106, by causing conduit 106 to become locally narrower, as a consequence, the inner walls of conduit 106 may apply friction force restricting the movement of operational tool 200 or its burst out packed tools placed within, causing a feedback force sensation felt by the user.

According to some embodiments, a motor 112, such as, for example, a Faulhaber drive system, a voice coil, a servo motor, a solenoid, a step motor, etc., is configured to apply rotational force that in turn rotates projection 114, that in turn, applies alternating vertical pressure upon pin 116. The alternating vertical force applied upon pin 116 is translated into longitudinal friction force as pin 116 applies pressure upon conduit 106, and as a consequence, causes an alternating friction force to the movement of operational tool 200 or its burst out packed tools placed within conduit 106.

According to some embodiments, other mechanisms can also cause an alternating resistance to the movement of operational tool 200 or its burst out packed tools placed within conduit 106. Such mechanisms can rely on, for example, (1) electromagnetic force field configured to cause alternating levels of resistance to the movement of operational tool 200 or its burst out packed tools within conduit 106. (2) hydraulic mechanism configured to cause alternating levels of pressure upon conduit 106 and as a consequence, to the movement of operational tool 200 or its burst out packed tools within conduit 106. (3) lubrication control mechanism that enables to change the friction coefficient of either operational tool 200, its burst out packed tools or the inner walls of conduit 106, resulting it alternating resistance level affecting the movement of operational tool 200 or its burst out packed tools within conduit 106.

According to some embodiments, the alternating levels of force applied by the haptic force mechanism are measured by a force sensor 118. According to some embodiments, said measurements are also be sent back to the controller using a closed loop feedback mechanism. The controller may use said gathered data to determine the alternating levels of force to be applied in order to affect the movement of operational tool 200 or its burst out packed tools, for example, in order to simulate a tool movement inside an organ as part of a medical procedure. Thus, obtaining a closed loop force feedback mechanism serves in emulating a real-life user haptics experience.

According to some embodiments, station unit 100 may be suitable for use along with a plurality of packed tools included within operational tool 200, and having different diameters (as opposed to conventional station units that are suitable for tools having a specific diameter), accordingly, all of the station units 100 may be substantially identical and may be used along with different operational and packed tools having different diameters (e.g., sheaths, catheters or guidewires etc.).

According to some embodiments, the force feedback mechanism may be controlled to simulate the force that may be applied on any operating tool 200 or its burst out packed tool being inserted of placed within a particular human organ (e.g., a blood vessel) according to a simulation procedure selected by the user using the user interface included in the controller. For example, the controller may direct the force feedback mechanism to apply force that simulates a catheter upon impacting a wall of a coronary artery or other organic tissue.

According to some embodiments, tracking information, for example, the bearings of operational tool 200 or its burst out packed tools placed within station unit 100 may be detected by tracking sensor 108. According to some embodiments, tracking sensor 108 may be an optical unit that may include a light source and a screen for acquiring pictures of the tools pattern when it is being manipulated by the user while tracking the pattern changes along a timeline. According to some embodiments, tracking sensor 108 may utilize the same methods and components used in an optical mouse. According to some embodiments, the detected bearings of the operational tool 200 or its burst out packed tools tracked by tracking sensor 108 may be forwarded to the controller that may further determine the amount of force to be applied by the haptic force feedback mechanism.

According to some embodiments, if the movement of the operational tool 200 or its burst out packed tools indicates that it has been manipulated to leave a coronary artery and enter a narrower artery, the amount of force that should be applied to the operational tool 200 or its burst out packed tools may increase. In some embodiments, tracking sensor 108 may be replaced by a mechanical or opto-mechanical tracking unit, for example, by using the same mechanisms as in trackball mouse or other kinds of mechanical tracking devices.

According to some embodiments, diameter sensor 110 may be configured as part of station unit 100 in order to detect diameter information related to operational tool 200 or its burst out packed tools, for example, detecting which tool is being inserted into conduit 106. According to some embodiments, diameter sensor 110 may be included in conduit 106 or may be a separate component of station unit 100. According to some embodiments, diameter sensor 110 may detect the diameter of operational tool 200 or its burst out packed tools inside conduit 106 or outside conduit 106.

According to some embodiments, the controller may receive the determined diameter, may identify the type of the operational tool 200 or its burst out packed tools and may combine a pre-stored data concerning the properties of said tool in the simulation and predetermined parameters of desired simulation procedure along with the determined diameter and the type of said tool in order to further control haptic force feedback mechanism.

According to some embodiments, diameter sensor 110 and tracking sensor 108 may be included in a single sensor (e.g., an optical sensor). The single sensor may be optically and/or mechanically configured to measure the bearings of an operational tool 200 or its burst out packed tools and detect the diameter of said tools. According to some embodiments, the single sensor may be in communication with or controlled by the controller. In some embodiments, station unit 100 may be designed such that both the bearings and the diameter of the operational tool 200 may be detected by a single sensor. An exemplary single sensor, according to some embodiments of the invention, may be a laser sensor based on Doppler Effect or other optical sensors.

According to some embodiments, the tracking sensor 108 may be self calibrated such that each tracking sensor 108 may perform a self calibration routine. According to some embodiments, the self calibration may include, determining for each tracking sensor 108, one or more calibration parameters, during the manufacturing process of the tracking sensor 108 and/or the manufacturing processes of the station unit 100 in case the tracking sensor 108 includes within, and utilize the parameters during tracking operation. The calibration parameter(s) may be stored in a memory associated with the tracking sensor 108 or station unit 100 or, alternatively, may be stored in a memory associated with the casing device 10 or in the controller.

In some exemplary embodiments, the calibration parameters may be acquired using a designated calibrator and method. The calibrator may be controlled by a processor and may include a tool channel, a motorized tool having a known radius (e.g., a catheter) or a motor controlled by a motor controller being in communication with the processor. The calibrator may manipulate the tool at movements and rates (backwards, forwards and rotation) having known values. The processor may receive said known values from the motor controller and may further compare said known values with values received from tracking sensor 108 and/or diameter sensor 110. The processor may calculate based on the comparison (using for example, an interpolate polynomial) a set of calibration parameters. This process may be conducted during the manufacturing of each station unit 100, for every tool diameter, result in an array of calibration parameters comprising a plurality of parameter sets to be stored in a memory associated with the station unit 100. The calibration parameters may include parameters directed to calibrate tracking sensor 108 or diameter sensor 110 or both.

According to some embodiments, a memory associated with the controller may store instructions for performing a simulation of an image guided medical procedure. The instructions may include obtaining a three-dimensional (3D) medical image depicting an organ of a patient, producing a computerized 3D anatomical model of the organ according to the obtained 3D medical image and simulating an image-guided procedure according to the 3D model. Instructions related to simulating an image-guided procedure may further include receiving inputs from sensors, for example, receiving from the tracking sensor 108, tracking information related to the movements of the various tools and/or receiving information related to the type of the tool from diameter sensor 110.

According to some embodiments, the controller may receive from the user using the user interface, instructions to be executed by the processor, for example, the user may select a type of an operational procedure (e.g., balloon angioplasty) to be conducted, as well as the location of a blockage within the arterial network. The controller may then determine the amount of pressure that the haptic force feedback mechanism may apply to the operational tool 200 or its burst out packed tools according to the user's selection. Accordingly, the controller may display to the user, on a display, a simulated image (e.g., a simulated fluoroscopic image) of the location of the operational tool 200 or its burst out packed tools within the arterial network.

According to some embodiments, the controller may further determine the force to be applied by the haptic force feedback mechanism of each station unit 100, according to the inputs received from the processor. For example, the controller may receive an input from the processor indicating that the operational tool 200 diameter at position A is substantially that of an arterial diameter (such as 2-5 mm). the controller may determine, based on said diameter detection, that a sheath was inserted at position A.

The controller may further receive data regarding the bearings of the sheath indicating that the tool has been inserted into a blood vessel for additional few cm and may calculate a new location of the sheath within the arterial network. The controller may further determine what is the force that may be applied by the haptic force feedback mechanism of a certain station unit 100 at position A, based on: the new location of the sheath in the arterial network, the simulated procedure selected by the user and the manipulation of the operational tool 200 performed by the user during the simulation detected by tracking sensor 108 at position A.

According to some embodiments, the processor may communicate with the controller via a communication interface. Communication interface may communicate with the controller by either wired or wireless communication. According to some embodiments, the communication interface may include any port for wired communication, for example, a USB port, an RJ LAN port or a serial port; or may include wireless communication components, for example, a WiFi antenna. The communication interface may be installed in the casing device 10 such that communication between the processor and the controller may be established when each station unit 100 is docked into connection base 12. According to some embodiments, station unit 100 and connection base 12 may include plug-in components configured to establish a communication between the station unit 100 and the user interface.

Figures 7, 8:
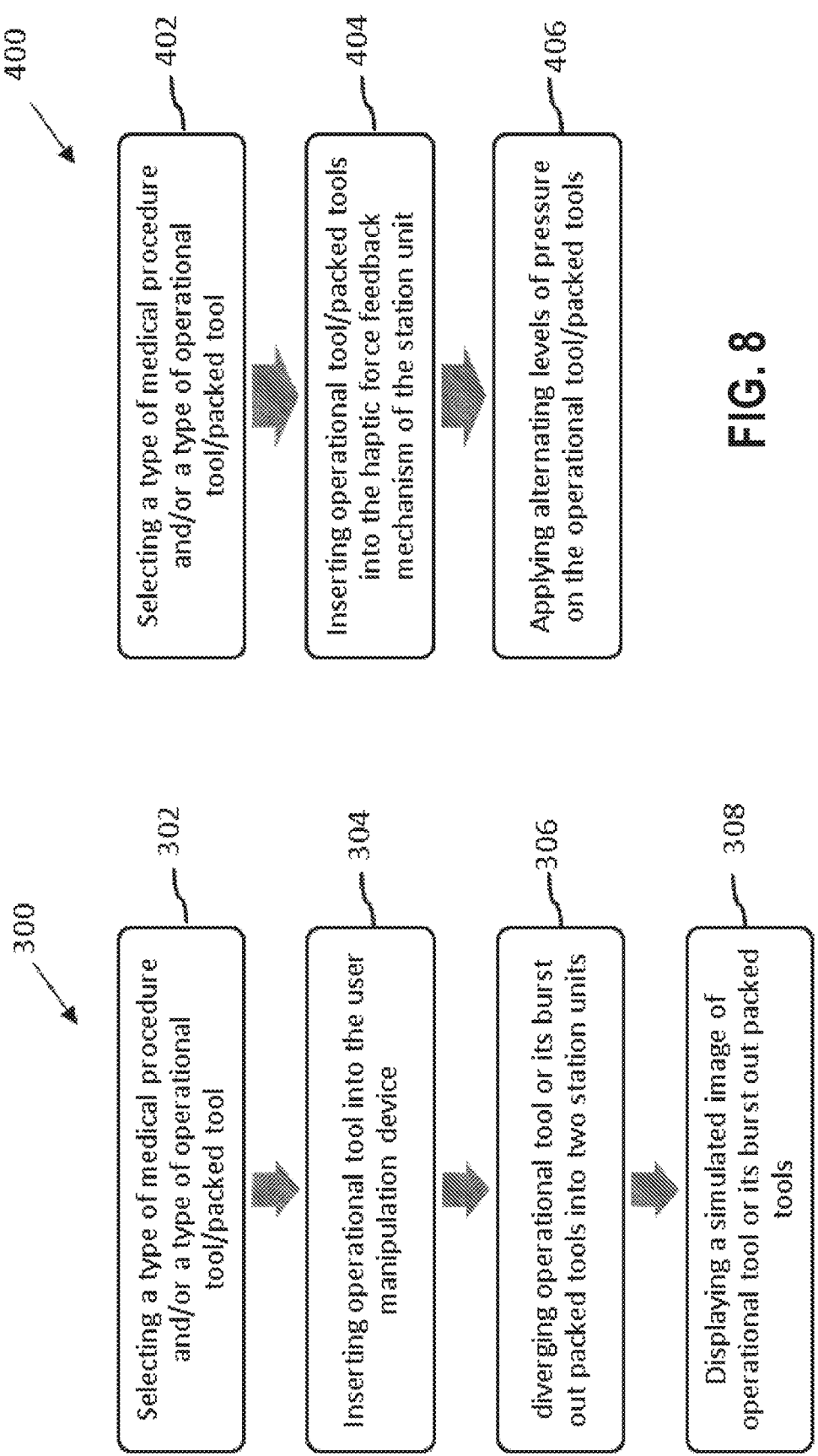
FIG. 7 constitutes a flowchart diagram illustrating a method of using a medical simulation system, according to some embodiments of the invention.
FIG. 8 constitutes a flowchart diagram illustrating a method of using the haptic force feedback mechanism of a station unit, according to some embodiments of the invention.

Reference is made to FIG. 7 which constitutes a flowchart diagram illustrating a method of using the medical simulation system, according to some embodiments of the invention. In operation 302, the method may include using the controller to select a type of medical procedure to be simulated or selecting a type of operational tool 200 or a type of at least two packed tools capable of bursting out from said operational tool 200 (e.g., sheath, catheter, guidewire etc.). In operation 304, the method may include inserting the selected operational tool 200 into the casing device 10 through either opening 16a or 16b and advancing the operational tool 200 until it reaches either router 18a or 18b. In operation 306, the method may include diverging, using either router 18a or 18b, at least one of burst out packed tools of operational tool 200, into at least one of at least two station units 100. In operation 308, the method may include using the controller in order to simulate and display an image (e.g., a simulated fluoroscopic image etc.) of the operational tool 200 or its burst out packed tools inside the casing device 10 as part of simulating a medical procedure (e.g., balloon angioplasty etc.).

Reference is made to FIG. 8 which constitutes a flowchart diagram illustrating a method of using the haptic force feedback mechanism of the station unit 100, according to some embodiments of the invention. In operation 402, the method may include using the controller to select to select a type of medical procedure to be simulated or selecting a type of operational tool 200 or a type of at least two packed tools capable of bursting out from said operational tool 200 (e.g., sheath, catheter, guidewire etc.). In operation 404, the method may include inserting the selected operational tool 200 or at least one of its burst out packed tools into a station unit 100 operation 404 may further include a simulation of the operational tool 200 or its burst out packed tools as part of a medical procedure using a display. In operation 406, the method may include using the controller to apply alternating levels of pressure on the operational tool 200 or at least one of its burst out packed tools as part of simulating a medical procedure, and, more specifically, as part of simulating the presence or advancement of a medical tool within a real-life organ.

Although the present invention has been described with reference to specific embodiments, this description is not meant to be construed in a limited sense. Various modifications of the disclosed embodiments, as well as alternative embodiments of the invention will become apparent to persons skilled in the art upon reference to the description of the invention. It is, therefore, contemplated that the appended claims will cover such modifications that fall within the scope of the invention.

The invention claimed is:

1. A medical simulation system, comprising:
   (i) a casing device having at least one opening and comprising at least three working stations wherein at least one working station comprising a router;
   (ii) at least one operational tool comprising at least two packed tools capable of bursting out of said operational tool; and
   (iii) at least one sensor,
   wherein the at least one operational tool or at least one burst out packed tool is configured to be inserted into the at least one opening and through at least one working station;
   wherein the at least one operational tool or at least one burst out packed tool is configured to pass through and be diverged by the router;
   wherein a controller is configured to receive data from the at least one sensor and generate an output representing the said tools' bearings within the casing device;
   wherein at least one working station is configured to comprise at least two station units, each capable of accommodating at least one operational tool or at least one burst out packed tool;
   wherein each station unit comprises:
     (i) a conduit capable of accommodating at least one operational tool or at least one burst out packed tools; and
     (ii) a haptic force feedback mechanism configured to apply force on said conduit,
   wherein the haptic force feedback mechanism is configured to apply alternating levels of pressure on the conduit and as a consequence, apply alternating levels of pressure on the at least one operational tool or on at least one burst out packed tools accommodating said conduit;
   wherein the alternating levels of force are measured by at least one sensor; and
   wherein said measurements are used by the controller to regulate the alternating levels of force in order to simulate a medical procedure.

2. The system of claim 1, wherein the casing device comprising sensors configured to track the bearings of the at least one operational tool or at least one burst out packed tool.

3. The system of claim 1, wherein the operational tool is configured to be inserted into the router and stop while at least one burst out tool of the at least two packed tools continue to be movable and navigable toward a desired route.

4. The system of claim 1, wherein the router comprising a turning arm used to diverge the operational tool or at least one burst out packed tools.

5. The system of claim 1, wherein the router comprising a motor used to diverge the operational tool or at least one burst out packed tools.

6. The system of claim 1, wherein the router is configured to diverge the at least one operational tool or at least one burst out packed tool into at least one station unit.

7. The system of claim 1, wherein the vertical force applied by the haptic force feedback mechanism is translated into longitudinal pressure on the conduit affecting the movement of the at least one operational tool or the at least one burst out packed tool accommodating said conduit.

8. The system of claim 1, wherein a diameter recognition sensor is configured to recognize the diameter of the operational tool or the burst out packed tool accommodating the station unit.

9. The system of claim 8, wherein the diameter recognition sensor is an optical sensor.

10. The system of claim 1, wherein a tracking sensor is configured to detect information regarding the bearings of the at least one operational tool or the burst out packed tool inside the station unit.

11. The system of claim 10, wherein the tracking sensor is an optical navigation sensor.

12. The system of claim 10, wherein the tracking sensor is calibrated by a self calibration process.

13. The system of claim 1, wherein the haptic force feedback mechanism comprising application of pressure on the conduit by alternating levels of vertical force.

14. The system of claim 1, wherein the sensor is configured to sense the operational tool or the burst out packed tool in a pre-defined location within station unit.

15. The system of claim 1, wherein the conduit is a resilient tube.

16. The system of claim 1, wherein a connection base is configured to enable the assembly and disassembly of each station unit.

17. The system of claim 16, wherein the assembly and disassembly are done by a manual manipulation.

18. The system of claim 16, wherein a visual indication is configured to indicate whether the station unit is securely assembled onto its connection base.

19. The system of claim 1, wherein a visual indication is configured to indicate the advancement of the at least one operational tool or a burst out packed tool along the length of the station unit.

20. The system of claim 1, wherein a visual indication is configured to indicate the presence of either the at least one operational tool or a burst out packed tool inside each station unit by displaying different visual marks accordingly.

21. A method for simulating medical procedures, comprising the steps of:
   i. providing the system of claim 1,
   ii. selecting, using the controller, a type of medical procedure or a type of the at least one operational tool or a type of the at least two packed tools capable of bursting out from said operational tool,
   iii. inserting the at least one selected operational tool into the casing device, iv. diverging the at least one operational tool or the at least one burst out packed tool into at least one of at least two station units,
v. displaying, using the controller, a simulated image of the at least one operational tool or the at least one burst out packed tool as part of simulating a medical procedure.

22. A method for simulating medical procedures, comprising the steps of:
i. providing the system of claim 1,
ii. selecting, using the controller, a type of medical procedure or a type of the at least one operational tool or a type of at least one packed tool capable of bursting out from said operational tool,
iii. inserting the at least one operational tool or the at least one burst out packed tool into a station unit,
iv. applying, using the controller, alternating levels of pressure on the operational tool or on the at least one burst out packed tool as part of simulating a medical procedure.

* * * * *